United States Patent [19]

Berson et al.

[11] Patent Number: 5,819,239

[45] Date of Patent: Oct. 6, 1998

[54] METHOD OF VERIFYING PROPER PAYMENT OF POSTAGE

[75] Inventors: William Berson, Weston; Peter C. Digiulio, Fairfield, both of Conn.

[73] Assignee: Pitney Bowes Inc., Stamford, Conn.

[21] Appl. No.: 775,121

[22] Filed: Dec. 30, 1996

[51] Int. Cl.⁶ .......................... G07B 17/04; G07B 17/02; G06F 17/60

[52] U.S. Cl. .................... 705/403; 235/375; 340/825.31; 705/404; 705/410

[58] Field of Search ..................................... 235/375, 380, 235/381, 382; 340/825.3, 825.31, 825.34, 825.35; 364/400, 479.01, 479.07; 705/1, 400, 401, 403, 404, 410

[56] References Cited

U.S. PATENT DOCUMENTS

| | | | |
|---|---|---|---|
| 4,168,533 | 9/1979 | Schwartz | 705/403 |
| 4,377,214 | 3/1983 | Hansen et al. | 177/25.15 |
| 4,524,426 | 6/1985 | Eckert et al. | 705/410 |
| 4,780,835 | 10/1988 | Sievel et al. | 364/550 |
| 4,811,234 | 3/1989 | Storace | 705/403 |
| 4,837,701 | 6/1989 | Sansone et al. | 705/404 |
| 5,060,165 | 10/1991 | Schumacher et al. | 364/478.01 |
| 5,075,852 | 12/1991 | Salazar et al. | 705/410 |
| 5,280,531 | 1/1994 | Hunter | 382/1 |
| 5,384,708 | 1/1995 | Collins et al. | 364/464.2 |
| 5,448,641 | 9/1995 | Pintsov et al. | 380/51 |
| 5,680,463 | 10/1997 | Windel et al. | 380/51 |

*Primary Examiner*—Edward R. Cosimano
*Attorney, Agent, or Firm*—Ronald Reichman; Robert H. Whisker; Melvin J. Scolnick

[57] ABSTRACT

A method is disclosed for ensuring proper payment by a mailer for postage indicia printed by the postage meter of a mailing machine operated by the mailer. The method includes a series of steps carried out by the mailer in connection with the preparation of a discrete quantity of mail by use of a mailing machine which has the capability of determining and recording in a database various characteristics of the mail that affect the postage required for a postal facility to handle the mail, and generates a product usage profile of the mailer's history of mailing. The Post Office counts the mail, and then calculates an expected cost of the mailing using data from the mailer's product usage profile, and then compares that expected cost with the amount of postage credit funds remaining in the mailer's postage meter to determine whether it is likely that any fraud has occurred in the preparation of the mailing.

15 Claims, 2 Drawing Sheets

METHOD OF VERIFYING PROPER PAYMENT OF POSTAGE

BACKGROUND OF THE INVENTION

The present invention relates generally to the field of handling metered mail by the U. S. Postal Service, and more particularly to a system for ensuring proper payment by mailers for the amount of postage that is printed in the form of postage indicia printed on envelopes and labels during operation of their mailing machines.

Mailing machines which include postage meters that print a postage indicia on a mail piece or label have long been well known and have come into extremely widespread use throughout virtually all forms of commercial establishments, professional offices, publishing and financial institutions, public utilities, and many other business operations that generate mail, even in relatively small volume. Well over half a century of experience has convincingly demonstrated that the advantages of using mailing machines far outweigh the tedious and time consuming practice of moistening postage stamps and applying them to mail pieces, not to mention the inherent possibility of loss of money from unscrupulous employees and others who steal the stamps. The use of mailing machines greatly increases the rate at which large volumes of mail can be processed through other forms of automated mail handling machines, since the postage franking process can keep pace with the normal flow of mail through these machines. Thus, there is little if any doubt at the present time that mailing machines have become an indispensable item of office equipment in any of the forms of business operations mentioned above.

Unfortunately, as is the case in many types of commercial operations, there are those unscrupulously creative individuals who devise various schemes for defeating the basic purpose of the postage meter, the end result being that mailers could print, or otherwise duplicate the printing of, postage indicia on mail for which proper payment had not been made. This illegal activity was recognized very early in the development of the postage meter, and in an effort to prevent it, postage meters were provided with some form of lockout mechanism which prevented them from operating after the amount of postage paid for had been printed. Thus, a mailer took his meter to a Post Office where a clerk opened it, reset it to print a predetermined amount of postage, e.g., $100.00, and resealed it, for which the mailer paid the $100.00. Thus, the concept was that the postage used by the mailer was purchased and paid for in advance, and appropriate means were provided in the postage meter to disable further operation of it when that amount of postage had been printed.

The concept was sound in theory, and to a large extent it worked very well in practice, since in the early stages of postage meter use, the volume of use did not justify either the difficulty of achieving fraudulent use of the meter, or the risk of being caught in the commission of a federal crime. However, during the last several decades there has been such a dramatic increase in the volume of mail that various fraudulent practices for avoiding payment of postage used have become far more prevalent than heretofore. Several factors have contributed to the increase in mail volume, one in particular being the advent of credit cards which generate enormous quantities of mail in monthly bills to cardholders. Mail order purchasing is another significant factor contributing to the increase in mail volume. Further, mail volume in general has increased over the years as the general level of business activity has grown. Also, the present methods for detecting fraud require personal attention and investigation by postal officials, with the result that the high manpower required limits the use of audits or reviews to cases of suspected fraud and make routine audits impractical. Thus, despite the development over the years of various devices and methods which make postage fraud through the use of mailing machines more and more difficult, it would still be desirable for the postal authorities to have a cost efficient way to audit postage meter funds.

Two significant events in the development of postage meter technology played a major part both in enhancing the ability of dishonest mailers to devise new methods of printing, or otherwise duplicating the printing, or postage indicia for which proper payment had not been made. One was the development of electronic postage meters in which the former mechanical devices for monitoring the amount of postage indicia printed and preventing further operation of the meter when the amount of postage for which payment had been made was exhausted were replaced by far more sophisticated and intelligent electronic devices, including a microprocessor, which enabled the postage meter to generate and store for future retrieval a variety of information in the form of databases. Thus, these meters were now capable not only of monitoring the amount of postage used and locking out the meter when the postage for which payment had been made was exhausted, but also generating and storing various forms of data relating to the operation of the meter, such as volume of mail by class, weight, destination, period of time, etc., which could be used to verify operation of the postage meter over that period time.

Another event was the development of the technique of remotely resetting postage meters via telephone communication with a Post Office, in which a mailer could set up a postage account with the Post Office, pay into the account to establish sufficient credit to cover an order for an amount of postage, and then, when additional postage is required, establish a telephone communication between the Post Office and his mailing machine through which a computer could reset the meter for the designated amount of postage utilizing TOUCH TONES® telephone signaling technology. This system offered a tremendous convenience to the mailer in avoiding the necessity of carrying a postage meter to the Post Office.

Thus, the more that postage meter technology created the ability and the incentive for increased use of postage meters with consequent increase in the volume of metered mail, the more became the incentive for unscrupulous mailers to devise various schemes for illegally obtaining postage. Thus, the fundamental problem faced by Post Offices in connection with this technology, that of verifying that proper payment has been made for each piece of metered mail passing through the Post Office, becomes increasingly difficult.

The only 100% verification method available consisted of examining every piece of mail arriving at the Post Office from all mailers utilizing postage meters, and looking at the printed postage indicia to determine whether it was fraudulently created, whether it had a valid serial number for the meter, and scanning the envelopes to enter such information as the amount of postage, the date, the identification of the mailer, and possibly other information, into a database. The Post Office would then have to initiate a verification procedure to compare the amount of postage printed by the mailer's postage meter over a specified period of time, or for a specified amount of mail, with the amount of money paid by the mailers for the postage printed for the same or a comparable period of time, or for the same amount of mail.

It should be apparent that the time and effort required to initially audit all the metered mail arriving at the Post Office and then perform the correlation of the results of the audit with the amount of money paid by the individual mailers for the postage printed by their postage meters renders the entire verification process virtually impossible, not only from a practicality standpoint but also because it would be prohibitively expensive.

Thus, there is a need for a system for that produces the results of the 100% audit of incoming mail coupled with correlation of the amount of postage indicia printed with the amount funds paid by mailers for postage meter use without going through the arduous, time consuming and intolerably expensive system just described.

BRIEF SUMMARY OF THE INVENTION

The method of the present invention greatly obviates if not entirely eliminates the problems and disadvantages inherent both in prior art devices and techniques for dealing with the problems of postage meter fraud, as well the problems presently recognized in trying to achieve total elimination of postage meter fraud by the above described system. The basic concept of the method of the invention is that substantially the same beneficial results as those inherent in the system just described can be obtained through the use of the technique of statistical inference, often referred to as sampling, provided sufficiently accurate information can be obtained to generate statistically valid samples. The concept of sampling, of course, is well known and has been applied to an infinite variety of situations to generate various conclusions, especially numerical conclusions, and is based on the theory that the behavior of a large system or data stream can be predicted with a high degree of certainty by the correct examination of statistically significant, properly chosen samples.

In the method of the present invention, this concept of statistical inference is applied to the mailing function, and is predicated on the theory that if sufficient knowledge can be obtained of the patterns of creating mail of a particular mailer to establish a statistical mailing profile for that mailer, and then determining the predicted cost of a particular mailing delivered to the Post Office based on the mailer's statistical mailing profile, it is then a relatively simple procedure to ascertain whether or not it is likely that fraud has occurred by comparing the predicted cost of the mailing with the amount of money actually paid to the Post Office by the mailer for postage credit in his meter.

Thus, the method of the present invention provides a reltively simple technique of comparing what a mailer should have paid for postage used over a specified period of time, or a specified amount of mail, against what he actually paid for postage over that period of time, or for that amount of mail, by utilizing an accurate profile of the mailing patterns of that mailer. This is accomplished by a series of steps which are carried out both at the mailer's site utilizing an intelligent mail preparation system to prepare mail, and at the Post Office which utilizes data generated by the mailer's mail preparation system to verify that the mailer has properly paid for postage which he has used. The mailer's mail preparation system has the capability of determining various characteristics of mail which cause the postage rates to be different from one mail piece to an other, such as weight, size, class and sometimes even destination, and generating and storing data pertaining to these characteristics. This information is stored in suitable databases in the mailing machine that is part of the mail preparation system, and can be retrieved as needed to establish the mailing profile, also called product usage profile, of the mailer, and this profile is available to the Post Office for use in a unique verification process based on the aforementioned statistical inference of the postage that should have been paid by the mailer, which is then compared with the amount of money actually paid by the mailer.

There are two embodiments of the method of the present invention. In the basic version, the verification process is a series of steps carried out by the mailer at his location in connection with the preparation of mail, either for a predetermined period of time or for a predetermined number of mail pieces, referred to as a batch. Regardless of which practice is used, the collection of mail that is to be the subject of the verification process at any given time is hereinafter referred to as the "discrete mailing." Another series of steps is carried out at a Post Office after the mail for the predetermined period of time or that in the batch is delivered to the Post Office. The latter series of steps are directed to determining whether or not, based on the statistical inference from the mailer's product usage profile, it is likely that the mailer did not have sufficient postage credit funds in the form of postage credit in his postage meter to cover the amount of postage actually printed for the mail he created during the predetermined period of time, or in the particular batch, whichever unit is being used for the verification being carried out. If it is determined that it is likely that the mailer did not have such sufficient postage credit funds, a fraud alert is generated and various inspections may be undertaken to ascertain with assurance whether any fraud has occurred or whether other events have caused the likelihood thereof to appear. Thus, in the basic version, the verification process is an individual event for the mailer.

In an enhanced version of the method of the invention, the verification process includes a further series of steps by which it can be carried out on an ongoing basis by the Post Office, which has the unique advantage that the Post Office is afforded constant assurance that all applicable funds for postage credit to mailers are being paid for by the mailers. In order to accomplish this, the Post Office also maintains, in addition to the database of the actual funds paid to the Post Office by the mailer over an extended period of time, a database of the forecast amount of postage that it is expected the mailer will use over that extended period of time based on his product usage profile, which is periodically communicated by his mailing machine to the Post Office. If, at any time, it is likely, based on the above procedure, that the mailer does not have sufficient postage credit funds in his meter to cover the cost of a particular discrete mailing, then the same alert is given. If, on the other hand, no such likelihood exists, then the mailer can arrange with the post Office for a transfer of further funds to his postage meter to permit continued use.

In a variation of the foregoing process, a third party may be utilized to provide the necessary computer equipment and maintain the necessary database of the expected or forecast amount of postage that the mailer will use during the extended period of time, thereby relieving the Post Office of the burden of maintaining the necessary computer hardware and databases for this purpose, and the manpower to operate this portion of the system.

Thus, the present invention, basically, is a method of ensuring proper payment by a mailer for postage indicia printed by the postage meter of a mailing machine operated by the mailer. In this invention, the method comprises the steps of, at the mailer's location, preparing a discrete mailing for which the expected cost of mailing thereof is to be audited, the preparation of the discrete mailing including printing with a postage meter a postage indicia on each piece of mail in the discrete mailing to evidence payment by the mailer to a postal facility for handling that piece of mail, and delivering the discrete mailing to the postal facility. At the postal facility, the discrete mailing is counted to determine a piece count of the number of pieces of mail in the discrete mailing. A determination is then made as to whether or not it is likely that there was insufficient postage credit funds in the mailer's postage meter to cover the expected cost of the discrete mailing, and if it is so likely, a fraud alert is generated to indicate an apparent discrepancy between the expected cost of the discrete mailing and the amount of funds actually received by the postal facility for the postage credit used by the mailer in preparing the discrete mailing. By this procedure, the postal facility is afforded an opportunity to statistically monitor the amount of funds paid by a mailer for postage meter credit without performing a 100% audit of his mailings.

In some of its more limited aspects, in the basic version of the invention, the step of preparing the discrete mailing includes the steps of determining various characteristics of each piece of mail in the discrete mailing that may affect the amount of postage required by the postal facility for handling that piece of mail, and maintaining a data record of the characteristics which is updated with each successive piece of mail that is prepared. In addition, a running piece count of each piece of mail that is prepared is maintained, and a record of the running piece count is also maintained.

At the postal facility, the step of ascertaining whether it is likely that there was insufficient postage credit funds in the mailer's postage meter to cover the expected cost of the discrete mailing includes the steps of calculating the expected cost of the discrete mailing based the piece count and on mailing characteristic data obtained from the mailer, then comparing the expected cost of the discrete mailing with the amount of postage credit funds known by the postal facility to be in the mailer's postage meter, to determine whether it is necessary to generate the fraud alert.

In the enhanced version of the invention, the mailer prepares his mail in the same manner as with the basic version, except that the data relating to the various characteristics of the discrete mailing is compiled in a database in the mailer's mailing machine as a product usage profile, the data from which is periodically communicated, typically by telephone, to the postal facility. Again, the expected cost of the discrete mailing is calculated and is compared with the amount of postage credit funds obtained from the mailer's product usage profile, and if the comparison fails to show that there was insufficient postage credit funds in the mailer's postage meter, the postal facility can then automatically transfer additional postage credit funds directly to the mailer's postage machine.

In a variation of the enhanced version of the invention, the mailer's product usage profile is communicated both to the postal facility and to a third party that maintains a database of the expected or forecast amount of postage that the mailer is expected to use for discrete mailings that will be monitored over an extended period of time.

Having briefly described the general nature of the present invention, it is a principal object thereof to provide a method for ensuring proper payment by a mailer for postage indicia printed by the postage meter of a mailing machine operated by the mailer.

Another object of the present invention to provide a method as set forth above which provides postal facilities with a verification process that produces substantially the same results as 100% physical audits of incoming mail heretofore carried on without the great time and effort consuming inconvenience and expense of the former process.

Still another object of the present invention to provide a method as set forth above which relies on predicting an accurate estimate of the expected cost of discrete mailings by a mailer utilizing data generated by the mailer relating to his mailing history.

It is a further object of the present invention to provide a method as set forth above which is relatively simple, can be carried out with known computer technology, and does not interfere with the normal mailing operations of the mailer.

These and other features and advantages of the method of the present invention will become more apparent from an understanding of the following detailed description of the best modes presently contemplated of carrying out the principles of the invention, when considered in conjunction with the accompanying drawings.

DETAILED DESCRIPTION OF THE INVENTION

Figure 1:
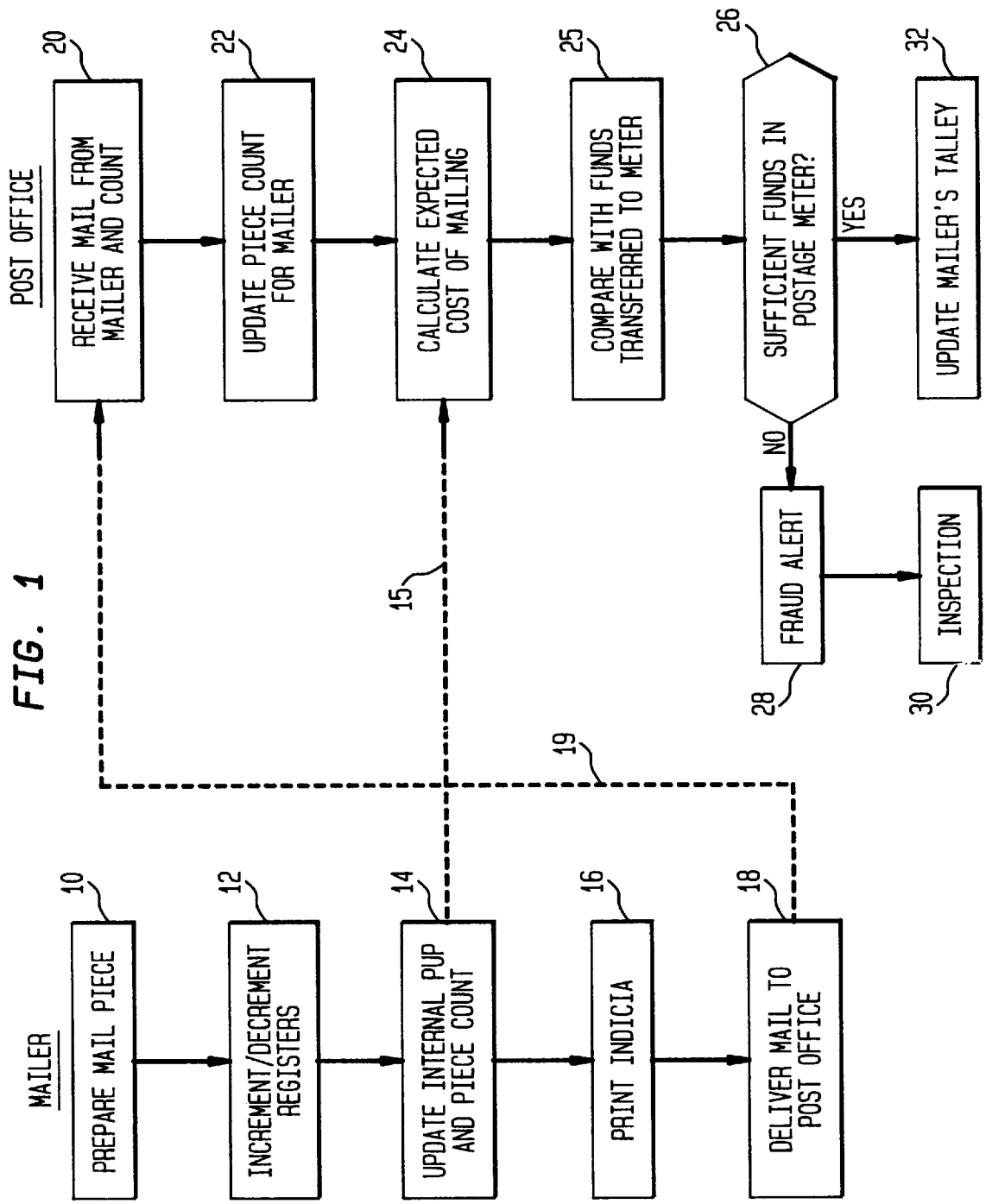
FIG. 1 is a flow chart for the basic version of the method of the present invention showing the steps carried out by the mailer at his location in creating the mail and by the Post Office in ascertaining the likelihood of fraud having been committed. The designation "PUP" is the abbreviation for "product usage profile."

Referring now to the drawings, and particularly to FIG. 1 thereof, the method of the basic version of the present invention is illustrated by a series of interconnected boxes which represent the steps that are carried out at the mailer's location in conjunction with the operation of his mailing machine to prepare mail and generate the data related thereto, and at the Post Office in conjunction with utilizing the data generated by the mailer in carrying out the verification process to ensure that the mailer is properly paying for the postage he is using. The boxes in the left column headed MAILER represent the steps carried out by the mailer, while the boxes in the right column headed POST OFFICE represent those carried out by the Post Office.

Thus, the first step in the method, represented by box 10, is that the mail is prepared, which means that the mail pieces are created by appropriate printing or otherwise and are put into envelopes which are sealed. This mail preparation may be carried out by hand or by appropriate computer controlled, automated mail preparation machines which can print the mail pieces, insert them into envelopes and seal the envelopes.

In the next step, represented by the box 12, the mail is franked, i.e., passed through a mailing machine which includes a postage meter which prints a postage indicia on each envelope representative of the amount of postage required for the Postal Service to handle that piece of mail.

As is well known in the art, the postage meter includes either mechanical or electronic input means for entering an amount of postage that is required for the Postal Service to handle the mail piece, and either mechanical or electronic ascending and descending registers which maintain, respectively, a running account of the amount of postage that has been printed by the postage meter and the amount of postage still available for printing before the postage meter exhausts its credit and locks out. Thus, when the appropriate amount has been entered into the postage meter, the ascending register is incremented and the descending register is decremented.

Substantially simultaneously with this step, the mailer's product usage profile in the mailing machine is updated, as indicated by box 14. Certain modern mailing machines, such as the PARAGON® mailing machine marketed by Pitney Bowes Inc., have the capability of generating and maintaining databases containing information relating to various characteristics of each piece of being processed, such as physical characteristics such as the dimensions and weight, mail classification and destination code, a piece count number, the date and time of processing, the serial number of the postage meter, the settings of the ascending and descending registers, and other possible data. All of this data is entered into the product usage profile. Perhaps the most important item of information, along with the amount of postage printed on each envelope, is the count, which is simply the number of mail pieces which are processed within a discrete batch of mail pieces which will form the basis for statistical inference that will be used in determining whether the mailer has properly paid for the amount of postage he is printing, as explained in further detail below. It should be noted that the mailer's product usage profile is communicated to the Post Office, as indicated by the broken line 15, in a manner and for a purpose further explained below.

As indicated by box 16, when the postage meter recognizes in known manner that appropriate information has been entered, and that there is sufficient postage credit remaining in the meter to cover the amount of postage required for the mail piece being created, the indicia is printed on the mail piece.

As indicated by box 18 and the broken line 19, the mail pieces are then delivered to the Post Office, either in undetermined amounts from time to time over a predetermined period of time or in predetermined batches, the latter being the typical practice in that the mailer's mail pieces for a given period of time, usually a day, are delivered in a tray or some other batch mode. This step completes the activities carried on by the mailer at his location utilizing his mailing machine in preparing the discrete mailing.

Referring now to the right side of FIG. 1, box 20 indicates merely that the mail pieces, prepared as described above, are received at the Post Office, where they are counted. Counting is carried out by any of a number of automated techniques which are known in the art for obtaining a rapid and accurate count of the number of mail pieces in a batch.

As indicated by box 22, generally at substantially the same time that the number of mail pieces in the batch are counted, the count is added to a database of the mail piece count that is maintained by the Post Office for mailers, either indefinitely or at least during the period of time that the mailers are being monitored to verify the accuracy of their payments for postage used.

As indicated by box 24, the next step is that the expected or forecast cost of the discrete mailing, i.e., the number of mail pieces delivered to the Post Office as per the piece count of step 22, is now predicted. This is accomplished in the Post Office computer by multiplying the piece count by the mailer's product usage profile which the Post Office has obtained, as indicated by the broken line 15, in any convenient manner, such as in hard copy form or electronically in a manner more fully described in connection with the procedures carried out in FIG. 2. For example, the mailer's product usage profile might indicate that typically 10% of his mail, that he prepares at a certain time of the month, is first class, 32¢ mail; 20% is first class, 64¢ mail, and other percentages may represent still further types or categories of mail. Also, the profile itself may change according to the time of the month or the number of pieces in the batch. For example, the profile may show that on the 1st and 15th of the month, the mailer is more likely to send first class envelopes with invoices which weigh less than one ounce, while at all other times, 90% of his mail weighs between two and three ounces. But in carrying out this step, the Post Office predicts the cost of the discrete mailing by this mathematical calculation, which is derived from the mailer's product usage profile and the piece count.

It should be noted at this point that the product usage profile, as created in the step described in connection with box 14, is the current best estimate of how the mailer prepares his mail. In connection with preparing this profile, there is a statistical judgment made as to whether the mailer's product usage profile is constant, and therefore has a high degree of predictability, or whether it is variable and therefore can't be used for an accurate forecast. If the only type of mail prepared by the mailer is first class, 32¢ mail, that is a constant profile with a high degree of predictability, and all that has to be done at the Post Office is simply to count the number of mail pieces in a batch. On the other hand, if, for example, every month the mailer has a different kind of mail preparation, then that presents a variable product usage profile with a low degree of predictability, which cannot be relied upon to predict an accurate cost of discrete mailing, and which, therefore, necessitates that the probable cost of mailing must be calculated as described in the preceding paragraph.

As indicated by box 25, the next step is to compare the expected cost of the discrete mailing, as determined by the step in box 24, with the actual funds that have previously been transferred to the mailer's postage meter. This step is also carried out in the Post Office computer which maintains a database of all funds that have been transferred from the Post Office to the mailer's postage meter.

As, indicated by box 26, the next step is that a decision is made as to whether it is likely that the mailer had sufficient postage credit funds in his postage meter to cover the expected cost of the discrete mailing that is being considered. Thus, an assessment is made as to the likelihood that fraud has occurred by subtracting the calculated expected cost of the discrete mailing from the current estimate of postage credit funds in the mailer's postage meter, and if the answer is less than zero, the question of fraud is raised, and further investigation may be undertaken. This step further includes a determination as to whether it is likely that the mailer's postage meter has properly printed the correct indicia, and that the correct funds have been decremented in the descending register.

As indicated by box 28, if it is likely that the mailer did not have sufficient postage credit funds to cover the expected cost of the discrete mailing, a suitable "fraud alert" signal is generated by the computer system which indicates that there is a discrepancy between the expected cost of the discrete mailing and the amount of money the mailer actually paid for the postage he used in preparing the discrete mailing. As a result, and As indicated by box 30, the Post Office would now go to a higher level of inspection to ascertain the cause of the discrepancy, and an inspection of the mailer's mailing machine would be carried out, together with questioning procedures of the mailer himself and his account status.

If, on the other hand, it appears that the mailer had sufficient postage credit funds in his postage meter to cover the expected cost of the discrete mailing, no fraud alert signal is generated, and, as indicated by box 32, the Post Office updates the mailer's talley, which is the forecast of the postage available and used. The mailer's talley is an estimate kept by the Post Office of the ascending and descending registers of the mailer's postage meter, and when a new amount of postage credit is put into the meter, or if for some reason the meter is inspected, this talley is corrected to agree with the actual funds paid by the mailer.

Thus, it will be seen from the foregoing series of steps that the basic method of the present invention has afforded a relatively simple and inexpensive may of permitting the Post Office to monitor the mailing procedures of mailers on a one time event basis for ensuring that mailers are properly paying for the postage used in their mailing machines in the course of periodic mailings. If the total objective of the invention were merely to make this determination on a one time basis, even if it were done repetitively from time to time, there would be no need for any further steps to be carried out, since the procedure set forth thus far can be carried out as a stand alone procedure.

However, an enhanced version of the method of the present invention provides a way of accomplishing a significant feature of the invention, which is that the verification process can easily be carried out on an ongoing basis. This benefits the mailer in that he does not have to generate a new product usage profile at periodic intervals when the Post Office decides it wants to implement an audit. Further, it benefits the Post Office in that it can maintain ongoing verification that the mailer is properly paying for the postage that he is using. An ancillary benefit to the Post Office is that the method also enables the Post Office to exercise a degree of control to ensure that the mailer is properly paying for the postage he is using by integrating the mailer audit function with the process of downloading funds to a postage meter through the now well known system of reloading postage meters with postage credit via telephone link directly with the Post Office.

Figure 2:
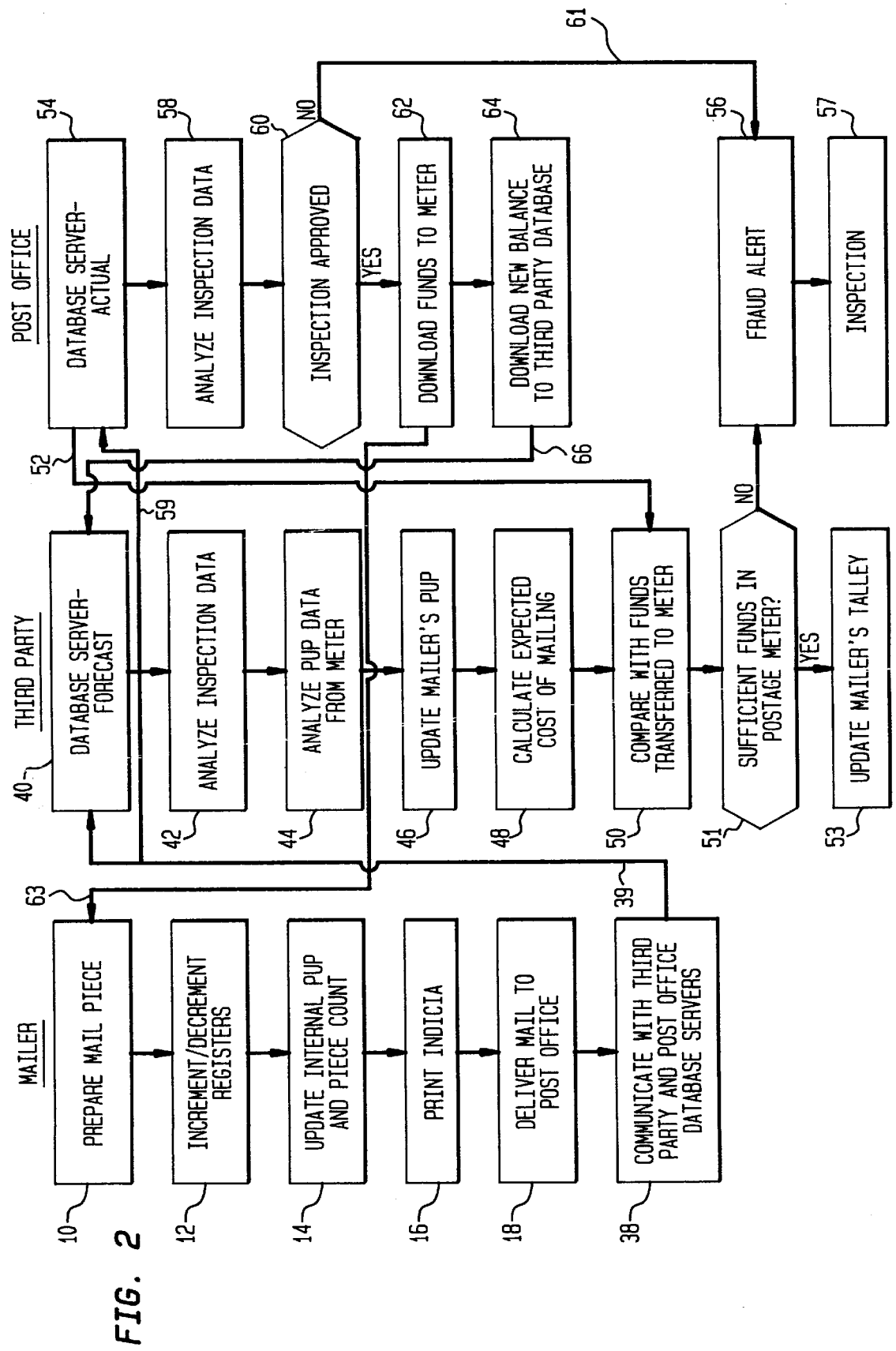
FIG. 2 is a flow chart for the enhanced version of the method of the present invention showing the steps carried out by the mailer at his location in creating the mail and showing the steps carried out by the Post Office, or by the Post Office and by a third party, to expand the method shown in FIG. 1 from an individual event to an ongoing process. Again, the designation "PUP" is the abbreviation for "product usage profile."

Thus, with reference now to FIG. 2, it will be seen that the left hand column of boxes under the heading MAILER is identical to the boxes 10 through 18 in the corresponding column of FIG. 1, since in the enhanced version of the method of the invention, the mail is prepared in the same manner as in the basic version. Although not shown with a broken line, mail is still delivered to the Post Office in the same manner as in the basic version. One significant difference for the mailer in this version of the method is that after the mail has been created and the mailer's product usage profile has been updated in his mailing machine, as previously explained in connection with FIG. 1, the information in the profile is communicated to a database server, indicated by box 38, in the manner further explained below.

As seen in FIG. 2, the steps carried out in accordance with the enhanced version of the process are divided between two entities other than the mailer. One is the Post Office, which functions much the same as it did in connection with the basic version of the method, with certain differences described below. The other entity is a third party, such as the manufacturer of the postage meter used by the mailer, although it may also be the Post Office depending on the circumstances mentioned below. The distinction between the functions of the Post Office and the third party, regardless of whether the third party is in fact a third party or is the Post Office, is that the Post Office of necessity maintains a database of information relating only to actual funds received from the mailer for postage credit he has purchased for his postage meter. The third party, on the other hand, maintains a database of information relating to the mailer's product usage profile, i.e., it stores the data relating to the nature of the mail created by the mailer. Thus, in short, the distinction between the Post Office and the third party is that of actual funds vs.forecast funds, that is, the Post Office has the database of actual funds received, used and available for the purchase of postage credit by a mailer, whereas the estimate of such funds or forecast database can be computed and maintained by the third party. Again, the database for the forecast funds may be maintained by the Post Office if it desires to acquire and maintain the computer equipment necessary to maintain this database and the manpower to operate it. In the discussed that follows, it is assumed that the database maintained for funds forecasting is maintained by a third party.

Thus, as indicated by boxes 38 and 40, and the line 39 in FIG. 2, the mailer's mailing machine periodically communicates with the computer database server maintained by the third party. As previously mentioned in connection with the calculation of the cost of mailing in box 24 of FIG. 1, this is the method of providing the Post Office with the mailer's product usage profile in the enhanced version of the method. This communication can occur on some regular basis, or whenever the mailer decides to have additional postage credit added to his postage meter, or in the course of making a periodic inspection of the postage meter. Also, the communication can occur via an electronic network, via mail pieces by being printed as a bar code on actual mail, a memory chip, a computer chip or via other electronic means. The preferred method is some form of electronic communication which greatly simplifies the data transfer process.

As indicated by box 42, the product usage profile data received from the mailer's mailing machine is analyzed by the third party's computer to ascertain a number of things relating to the mailer's postage meter, for example, whether the postage meter has malfunctioned, whether it has been tampered with, whether some kind of fraud has occurred, whether the interlocks have been tampered with, etc. This is, in effect, a check of these characteristics of the mailer's meter, and represents one of the data utilization services performed by the third party. If it appears that a problem does exist, the third party will notify the postal facility so that it can take such action as is deemed necessary.

The next step, as indicated by box 44, is another utilization step that is performed by the third party, which is that the data relating to the mailer's product usage profile is retrieved, so that the third party database server contains the information relating to which mail has been prepared and when by the mailer since the last upload of information. Since the third party provides the service of maintaining the mailer's trusted product usage profile for use by the Post Office, it must be updated periodically as discrete mailings are produced. The Post Office can audit the product usage profile database at any time to make sure that it is accurate and up to date.

Now that the mailer's product usage profile information is available, since it has been retrieved from the mailer's mailing machine, the next step, as indicated by box 46, is to update the mailers product usage profile in the database server of the third party. Since this is a profile, which is a statistical representation of the characteristics of mail produced by the mailer, the actual data can be reduced down, i.e., sampled, to update the profile. In other words, since the profile is actually a series of running averages of the mail characteristics, based on the size and frequency of discrete mailings, a sample size can be selected that will yield statistically significant forecasts. The profile can be considered to a running average of the mailer's activity, in that it provides a record what kind of mail has he produced on a periodic basis during this recent period of time.

As indicated by box 48, with the information from the mailer's product usage profile, the database server and the processor connected to it can calculate the expected cost of the discrete mailing that the mailer has brought to the Post Office, and this is done in the same manner as that described in connection with box 24 in the FIG. 1. i.e., we are calculating how much postage it is anticipated that the mailer has used based on his product usage profile and the piece count in connection with this discrete mailing.

As indicated by box 50, the next step is to compare the expected or forecast cost of the discrete mailing, as determined by the step in box 48, with the actual postage credit funds that have been transferred from the Post Office to the mailer's postage meter, and, again, this is carried out in the same manner as that described in connection with box 25 in FIG. 1. As indicated by the line 52, it will be seen that the Post Office database server, indicated by the box 54, in which the record of the funds actually paid by the mailer from time to time for postage credit is maintained, either periodically or on request, transfers this information to the third party database server, so that the comparison just mentioned can be carried out to determine whether there is sufficient postage credit funds in the postage meter to support the cost of the discrete mailing, as indicated by box 51. If the results of the comparison indicate that there is sufficient postage credit in the mailer's postage meter to cover the cost of the discrete mailing, then apparently there is no problem, and the mailer's talley is then updated, as indicated by box 53, in the same manner as previously described in connection with box 32 in FIG. 1. On the other hand, if the results of the comparison indicate that the mailer's postage meter does not have sufficient postage credit funds for the amount of postage credit that it is expected he will use, then it is likely that the postage credit in his mailing machine is exhausted. If this is the case, a fraud alert is generated by the computer, as indicated by box 56, which indicates a problem exists somewhere since it appears that the mailer's postage meter has printed more postage indicia for the discrete mailing than was available to cover the expected cost thereof. In response to the alert, the Post Office may initiate an inspection of the mailer's mailing machine, as indicated by box 57, to ascertain, for example, if it has been tampered with, or review his meter registers. This enables the Post Office to cause a physical inspection or an audit of the mailer's accounts when there is some indication that there is a need for such an audit. This is a substantial improvement over requiring a 100% audit of all mailers within the jurisdiction of the particular Post Office.

As indicated by box 58, at the Post Office, inspection data is analyzed in the same manner as described above in connection with the corresponding, step indicated by box 42, that is carried out by the third party database server. Thus, as indicated by the line 59, the mailer's mailing machine communicates with the Post Office database server, and the Post Office computer then analyzes the product usage profile data to ascertain the same circumstances relating to the mailer's postage meter as was ascertained by the third party, as previously explained in connection with box 42.

As indicated by the box 60, the question of whether the inspection reveals that any of the conditions set forth above relating to the inspection performed by the third party, as in box 42, such as fraud, tampering, malfunction, etc., is resolved, and if any such conditions exist, a fraud alert is issued as indicated by the line 61, and the same procedure is then followed that was described above in connection with the results of the determination of sufficient postage credit funds by the third party as shown in box 51.

On the other hand, as indicated by box 62, if the inspection is satisfactory, i.e., it does not reveal any unexpected causes for concern, then, as indicated by the line 63, funds are transferred to the mailer's postage meter in various manners known in the art, such as manual reloading of the meter at the Post Office or through a telephone link up between the Post Office and the mailer's mailing machine.

The last step in the process is that when the Post Office is downloading funds into the mailer's postage meter in either of the methods just mentioned, there is an opportunity to reconcile the third party database server forecast data with actual funds data by downloading the mailer's new balance of funds paid to the third party database server, as indicated by the line 66 connecting box 64 to box 40. This corrects the third party database server's forecast of the amount of postage to be used with the actual amount of postage that has been used since the previous downloading from the Post Office database, to thereby reconcile the third party database server funds forecast with the Post Office database server actual funds. This step is necessary because any system which relies on a statistical inference to determine if something is working well or not requires some way of periodically correcting the forecast so that it doesn't get out of line with the actual, with the result that even though there is very likely to be some small error in any forecast system of this kind, that error will be perpetually under control and small, since every time funds are downloaded to the mailer's postage meter, the third party forecast database server is reconciled and corrected.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

We claim:

1. A method of ensuring proper payment by a mailer for postage indicia printed by the postage meter of a mailing machine operated by the mailer, said method comprising the steps of:

A. at a mailer's location, preparing a discrete mailing for which the expected cost of mailing thereof is to be audited, said preparation of the discrete mailing including printing with a postage meter a postage indicia on each piece of mail in the discrete mailing to evidence payment by the mailer to a postal facility for handling that piece of mail, and delivering the discrete mailing to the postal facility, B. at the postal facility, counting the discrete mailing to determine a piece count of the number of pieces of mail in the discrete mailing, C. ascertaining whether or not it is likely that there was insufficient postage credit funds in the mailer's postage meter to cover the expected cost of the discrete mailing, and D. if it appears so likely, causing a fault signal to be generated to indicate an apparent discrepancy between the expected cost of the discrete mailing and the amount of funds actually received by the postal facility for the postage credit used by the mailer in preparing the discrete mailing, whereby the postal facility is afforded an opportunity to statistically monitor the amount of funds paid by a mailer for postage meter credit without performing a 100% audit of his mailings.

2. A method according to claim 1 wherein said step of preparing said discrete mailing includes the step of determining various characteristics of each piece of mail in said discrete mailing that may affect the amount of postage required by the postal facility for handling said piece of mail and maintaining a data record of said characteristics which is updated with each successive piece of mail that is prepared.

3. A method according to claim 2 wherein said step of preparing said discrete mailing further includes the step of maintaining a running piece count of each piece of mail that is prepared and maintaining a record of said running piece count.

4. A method according to claim 3 wherein said step of preparing said discrete mailing further includes the step of printing a postage indicia on each piece of mail in said discrete mailing which represents payment by the mailer to the postal facility for the handling by the postal facility of that piece of mail.

5. A method according to claim 1 where said step of ascertaining whether it is likely that there was insufficient postage credit funds in the mailer's postage meter to cover the expected cost of the discrete mailing includes the step of calculating the expected cost of the discrete mailing based the piece count and on mailing characteristic data obtained from the mailer.

6. A method according to claim 5 wherein said step of calculating the expected cost of the discrete mailing includes the step of determining the product of the piece count and the information in said data record.

7. A method according to claim 6 wherein said step of ascertaining whether it is likely that there was insufficient postage credit funds in the mailer's postage meter to cover the expected cost of the discrete mailing further includes the step of comparing the expected cost of the discrete mailing with the amount of postage credit funds known by the postal facility to be in the mailer's postage meter.

8. A method according to claim 1 wherein said step of preparing said discrete mailing includes the step generating a mailer's product usage profile within the mailer's mailing machine of various characteristics of each piece of mail in said discrete mailing that may affect the amount of postage required by the postal facility for handling said piece of mail and a running piece count of each piece of mail that is prepared for the discrete mailing, and periodically communicating said mailer's product usage profile to a third party and to the postal facility.

9. A method according to claim 8 further including the step of analyzing the mail piece characteristics data in the mailer's product usage profile to determine whether it appears likely that the mailer's postage meter has malfunctioned or been tampered with.

10. A method according to claim 9 wherein the step of analyzing the mail piece characteristics data includes the step of causing a fraud alert to be issued if it appears likely that the mailer's postage has malfunctioned or been tampered with.

11. A method according to claim 1 wherein said step of preparing said discrete mailing includes the step generating a mailer's product usage profile within the mailer's mailing machine of various characteristics of each piece of mail in said discrete mailing that may affect the amount of postage required by the postal facility for handling said piece of mail and a running piece count of each piece of mail that is prepared for the discrete mailing, and periodically communicating said mailer's product usage profile to the postal facility.

12. A method according to claim 11 further including the step of periodically transferring postage credit funds from the postal facility to the mailer's postage meter.

13. A method according to claim 11 wherein said step of ascertaining whether or not it is likely that there was insufficient postage credit funds in the mailer's postage meter to cover the expected cost of the discrete mailing includes the step of calculating the expected cost of the discrete mailing based the piece count and on certain mailing characteristic data contained in said mailer's product usage profile.

14. A method according to claim 13 wherein said step of calculating the expected cost of the discrete mailing includes the step of determining the product of the piece count and the information in said mailer's product usage profile.

15. A method according to claim 14 wherein said step of ascertaining whether it is likely that there was insufficient postage credit funds in the mailer's postage meter to cover the expected cost of the discrete mailing further includes the step of comparing the expected cost of the discrete mailing with the amount of postage credit funds known by the postal facility from the mailer's product usage profile to be in the mailer's postage meter.

* * * * *